(12) United States Patent
Burton

(10) Patent No.: US 8,542,325 B2
(45) Date of Patent: Sep. 24, 2013

(54) COLOR CHANGING CONTACT LENSES

(76) Inventor: Ehren Ray Burton, Leavenworth, KS (US)

( * ) Notice: Subject to any disclaimer, the term of this patent is extended or adjusted under 35 U.S.C. 154(b) by 138 days.

(21) Appl. No.: 13/304,667

(22) Filed: Nov. 27, 2011

(65) Prior Publication Data

US 2012/0069254 A1  Mar. 22, 2012

Related U.S. Application Data

(60) Provisional application No. 61/540,694, filed on Sep. 29, 2011.

(51) Int. Cl.
*G02F 1/1335* (2006.01)
*G02B 25/00* (2006.01)

(52) U.S. Cl.
USPC ............................. 349/13; 349/14; 359/643

(58) Field of Classification Search
USPC ...................................... 349/13, 14; 359/643
See application file for complete search history.

(56) References Cited

U.S. PATENT DOCUMENTS 6,544,193 B2 * 4/2003 Abreu ........................... 600/558
2012/0113384 A1 * 5/2012 Pasternak et al. ........... 351/159.3

* cited by examiner

*Primary Examiner* — Mike Qi
(74) *Attorney, Agent, or Firm* — James M Smedley LLC; James M. Smedley, Esq.

(57) ABSTRACT

The present invention generally relates to contact lenses. Specifically, this invention relates to contact lenses that change color based on one or more stimuli. The present application provides for a color changing contact lens that can change its color based on one or more stimuli. The color changing contact lens is constructed of an inner layer, an outer layer and a supply of liquid crystal.

10 Claims, 3 Drawing Sheets

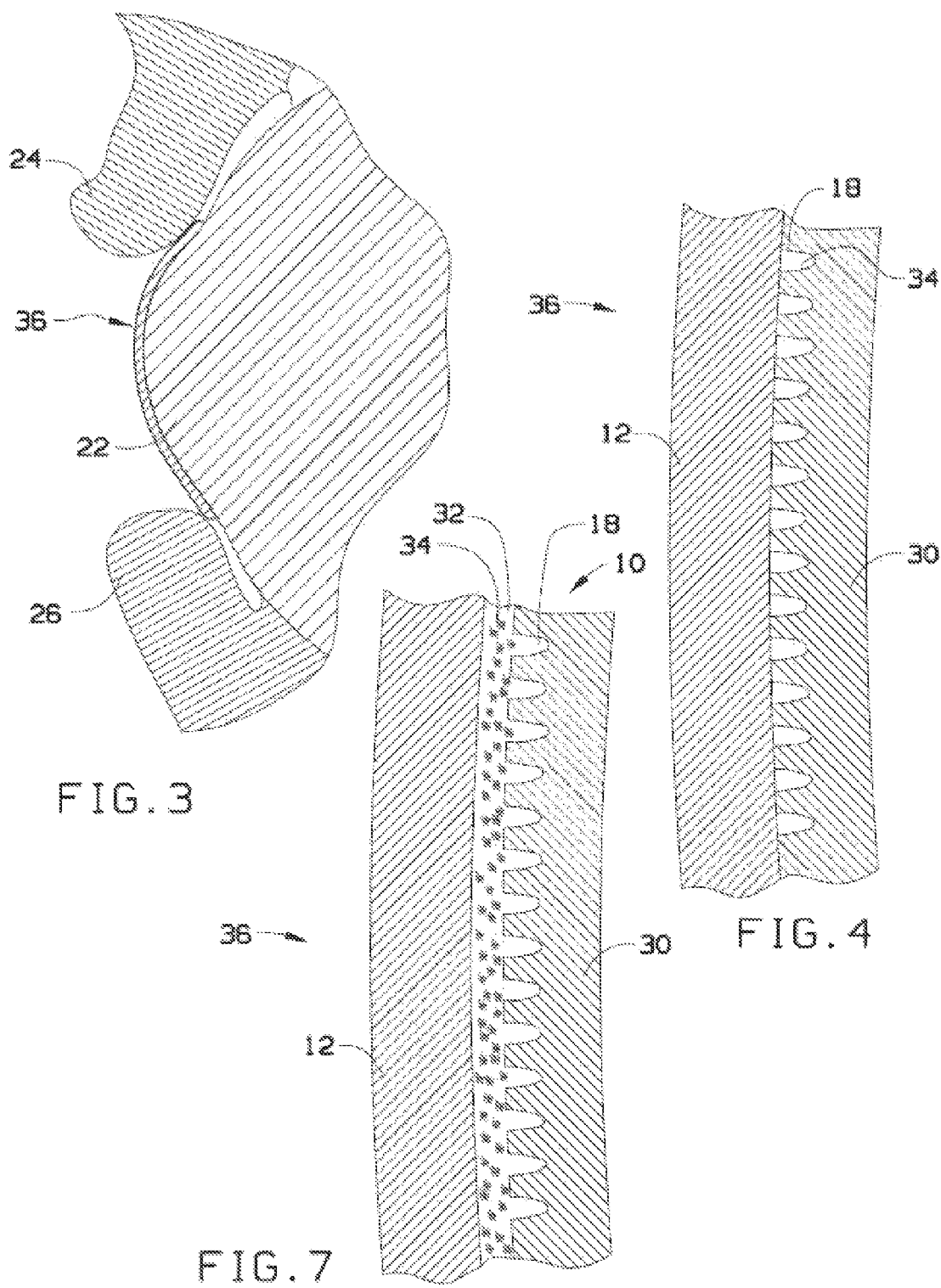

COLOR CHANGING CONTACT LENSES

CROSS REFERENCE TO RELATED APPLICATIONS

This application claims the benefit of U.S. Provisional Patent Application No. 61/540,694 Filed Sep. 29, 2011, the entire disclosure of which is incorporated herein by reference.

FIELD OF THE INVENTION

The present invention generally relates to contact lenses. Specifically, this invention relates to contact lenses that change color based on one or more stimuli.

BACKGROUND OF THE INVENTION

Vanity cosmetic alterations have been popular for years. It has been commonplace for individuals to alter the color of their hair, nails and skin in various ways utilizing a variety of products. Individuals have also utilized contact lenses to alter the color and/or shape of the irises.

Iris altering contact lens products currently available include alterations in a wide array of colors and shapes (e.g., cat-like, solid). However, currently available contact lenses are limited to a single color and/or shape. These lenses are formed in a manner such that the color and shape are selected at production.

If an individual desired to have different colored or shaped contact lenses, the individual would be required to remove the contact lenses currently worn with a new set of contact lenses of the desired shape and/or color. This is especially difficult since changing contact lenses typically requires one or more miscellaneous articles (e.g., mirror, contact lens case, saline solution).

Therefore, there is a need in the art for a color changing contact lens that can change its color based on one or more stimuli. These and other features and advantages of the present invention will be explained and will become obvious to one skilled in the art through the summary of the invention that follows.

SUMMARY OF THE INVENTION

Accordingly, it is an object of the present invention to provide a color changing contact lens that can change its color based on one or more stimuli.

According to an embodiment of the present invention, the color changing contact lens is constructed of an inner layer, an outer layer and a supply of thermo graphic liquid crystal.

According to an embodiment of the present invention, the inner layer is comprised of an interior side and an exterior side. The outer layer is also comprised of an interior side and an exterior side.

According to an embodiment of the present invention, the exterior side of the inner layer is configured to be received upon the eye of an individual.

According to an embodiment of the present invention, at least a portion of the interior side of the inner layer is configured to be in contact with an interior side of the outer layer in a manner such that a sealed area is formed between the inner layer and outer layer is formed.

According to an embodiment of the present invention, the interior side of the inner layer may be further comprised of a plurality of tubes configured to retain a substance within. The tubes may be nearly microscopic in size.

According to an embodiment of the present invention, the supply of the thermo graphic liquid crystal is contained within the sealed area between the inner and outer layers of the contact lens.

According to an embodiment of the present invention, the inner and outer layers may be constructed from glass or plastic materials or the like.

According to an embodiment of the present invention, the color of the contact lens may change based on one or more stimuli, such as temperature.

According to an embodiment of the present invention, the changing of the color of the contact lens is affected by changes in the thermo graphic liquid crystal.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

BRIEF DESCRIPTION OF THE DRAWINGS

FIG. 3 is a sectional view of a color changing contact lens in accordance with an embodiment of the present invention along line 3-3 in FIG. 1 illustrating placement of the contact lens onto the eye of a wearer;

FIG. 4 is a sectional view of a color changing contact lens in accordance with an embodiment of the present invention along line 4-4 in FIG. 2 illustrating layer components of the contact lens;

FIG. 7 is a sectional view of a color changing contact lens in accordance with an embodiment of the present invention.

DETAILED SPECIFICATION

The following detailed description details one or more preferred embodiments and best currently contemplated modes of carrying out exemplary embodiments of the invention. The description is not to be taken in a limiting sense, but is made merely for the purpose of illustrating the general principles of the invention.

Broadly, an embodiment of the present invention generally provides a contact lens that changes color depending upon one or more stimuli. More specifically, exemplary embodiments of the contact lens described herein employ a liquid crystal material that changes color in response to changes in one or more stimuli. In a preferred embodiment, a thermo graphic liquid crystal material is utilized that changes color in response to changes in the wearer's body temperature, thereby causing the color of the contact lens to change, for instance, with the mood of the wearer.

One of ordinary skill in the art would appreciate that thermographic liquid crystals (TLC) change color as a function of temperature when illuminated by white light. Hence reflect visible light at different wavelengths (colors). TLCs are usually made from a flat strip of liquid crystals with a protective coating. The crystals respond to changes in temperature by twisting. The twisting changes their molecular structure, which alters the wavelengths of light that are absorbed or reflected. 'Wavelengths of light' is another way of saying 'color', so when the temperature of the liquid crystals changes, so does their color. Liquid crystals possess the mechanical properties of a liquid, but have the optical properties of a single crystal.

In alternate embodiments, other materials may be utilized that are reactive to other stimuli. For instance, photosensitive liquid crystals may be utilized, allowing the contact lens to change color based on the amount of light being received upon the lens. Other materials may be affected by stimuli that include, but are not limited to, force, magnetic fields and electrical fields. One of ordinary skill in the art would appreciate that there are numerous color changing materials that may be utilized with embodiments of the present invention, and embodiments of the present invention are contemplated for use with any suitable color changing material.

A contact lens assembly 36 according to an embodiment of the present invention is shown in FIGS. 1-4. The contact lens assembly 36 may include an inner layer 30, and outer layer 12, and a supply of thermo graphic liquid crystal 34. The outer layer 12 may be positioned over the interior surface of the inner layer 30; and the thermo graphic liquid crystal 34 may be disposed between an interior surface of the inner layer 30 and an interior surface of the outer layer 12.

Figure 1:
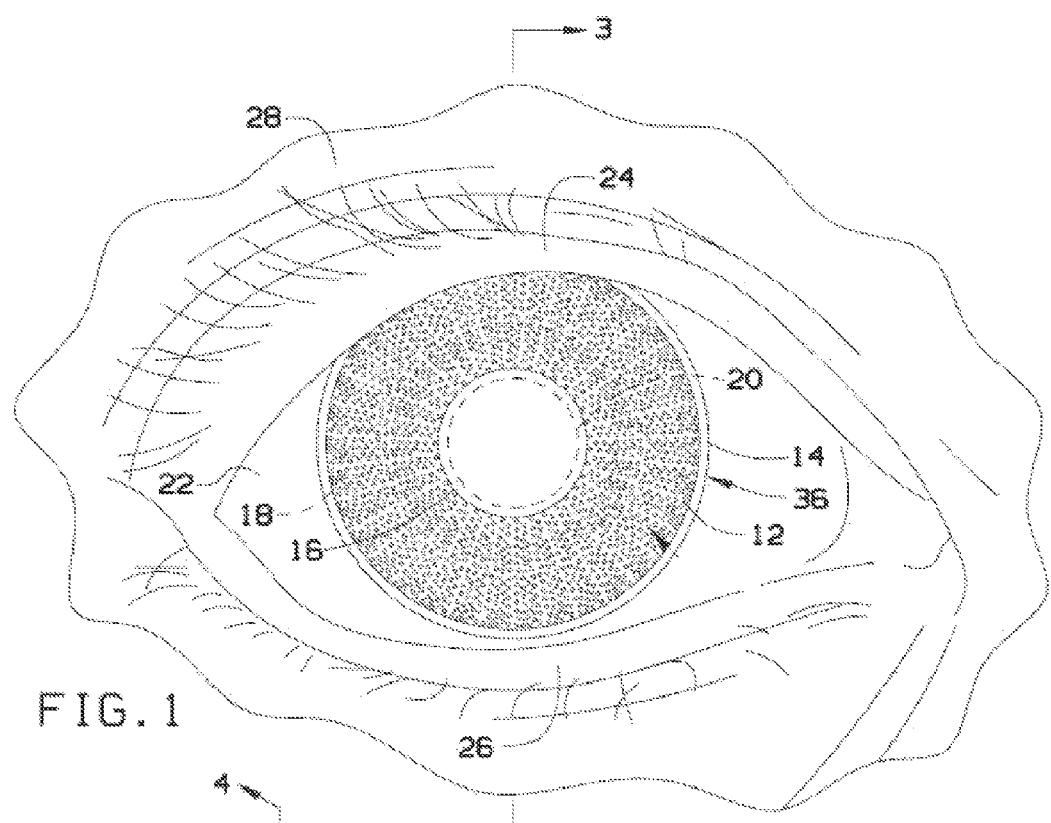
FIG. 1 is a front view of a color changing contact lens in accordance with an embodiment of the present invention shown in use.
Figure 2:
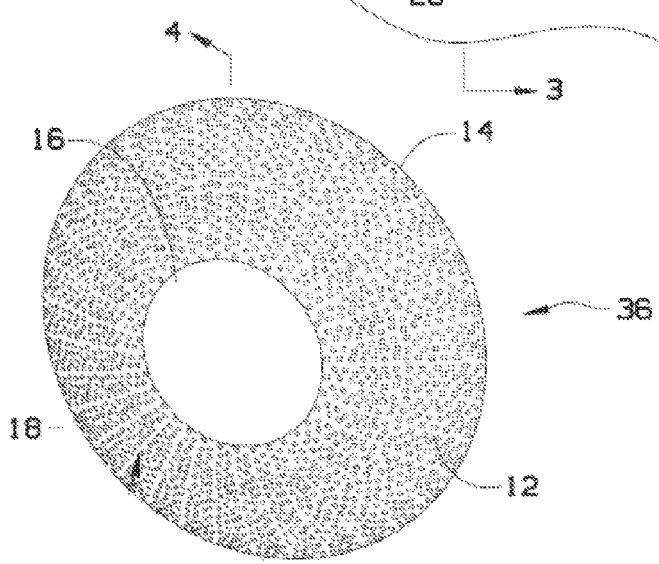
FIG. 2 is a perspective view of a color changing contact lens in accordance with an embodiment of the present invention.

Referring now to the drawings, FIGS. 1, 2 and 4 illustrate a contact lens assembly 36, according to one exemplary embodiment of the invention, 10 which may comprise the outer layer 12, a viewing portal 16, the inner layer 30 having a plurality of micro tubes 18, and the thermo graphic liquid crystal 34.

According to an embodiment of the present invention, the inner layer 30 may be made of plastic or glass. The construction material may be determined, at least in part, by the nature and character of the lens (e.g., disposable, permanent). One of ordinary skill in the art would appreciate that there are numerous materials that could be utilized for the inner layer in accordance with embodiments of the present invention, and embodiments of the present invention are contemplated with inner layers of any suitable material.

According to an embodiment of the present invention, the plurality of nearly-microscopic micro tubes 18 may be machined into the interior surface of the inner layer 30 and disposed along a brim 14 of the contact lens assembly 36 just outside or along the outer edge of the iris of a wearer 28. The micro tubes 18 may be filled with the thermo graphic liquid crystal 34. The outer layer 12 may be placed over the outer surface of the inner layer 30 in order to seal the thermo graphic liquid crystal 34 into the micro tubes 18. The outer layer 12 may be made of glass or plastic. When installed on the wearer's eye 22, the thermo 20 graphic liquid crystal material 34 may change colors in response to changes in the body temperature of the wearer 28.

In an alternative exemplary embodiment, thermo graphic liquid crystal-filled micro tubes 18 may be disposed over the interior surface of the inner layer 30 from the brim 14 to an iris viewing portal 16. No micro tubes 18 may be 25 located within the diameter of the viewing portal 16 as this may interfere with the wearer's vision.

In yet another alternative exemplary embodiment, the thermo graphic liquid crystal-filled micro tubes 18 may be disposed about the interior surface of the inner layer 30 to create designs in the contact lens assembly 36. Further still, the thermo graphic liquid crystal-filled micro tubes 18 may be configured in such a manner that as stimuli is applied to the liquid crystal composition, the shape of the designs appear to change, as well as the color, as expansion and retraction of the liquid crystal composition causes a greater/lesser number of the micro tubes 18 to be filled. One of ordinary skill in the art would appreciate that there are numerous types of designs and patterns that may be utilized with embodiments of the present invention, and embodiments of the present invention are contemplated for use with any design and/or pattern.

According to an embodiment of the present invention, the contact lens assembly 36 may be used in a manner similar to existing contact lenses. As illustrated in FIG. 3, the wearer 28 may place the contact lens assembly 36 between the wearer's upper eye lid 24 and lower eye lid 26 and against the wearer's eye 22. The contact lens assembly 36 may align on the wearer's eye 22 such that the wearer's pupil 20 may see through 5 the viewing portal 16. In a preferred embodiment, the thermo graphic liquid crystal 34 may change color in response to the change in the wearer's body temperature. For instance the temperature of the wearer's body may fluctuate with the wearer's mood or activity level.

Figure 5:
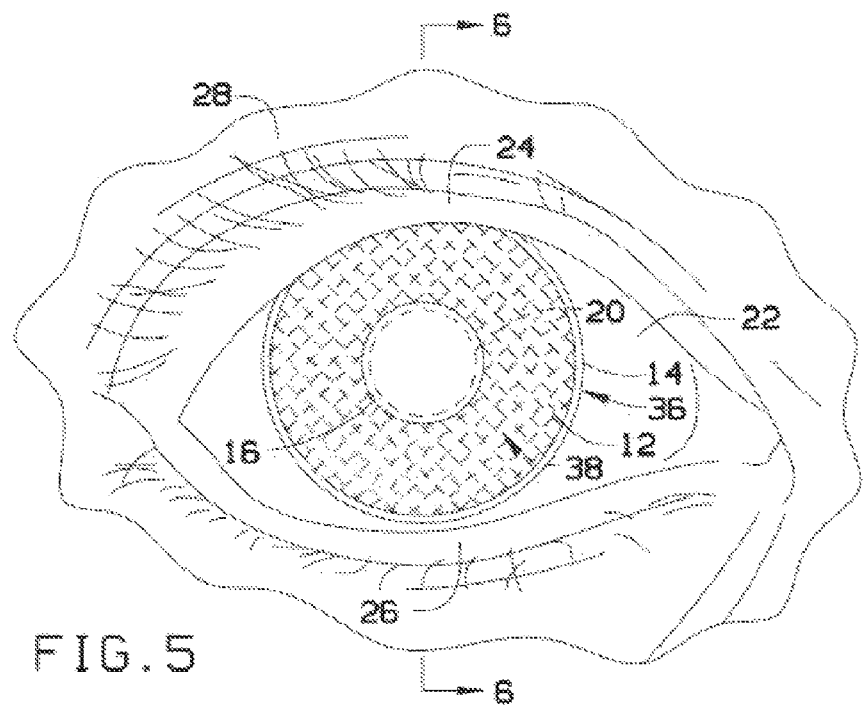
FIG. 5 is a front view of a color changing contact lens in accordance with an embodiment of the present invention.
Figure 6:
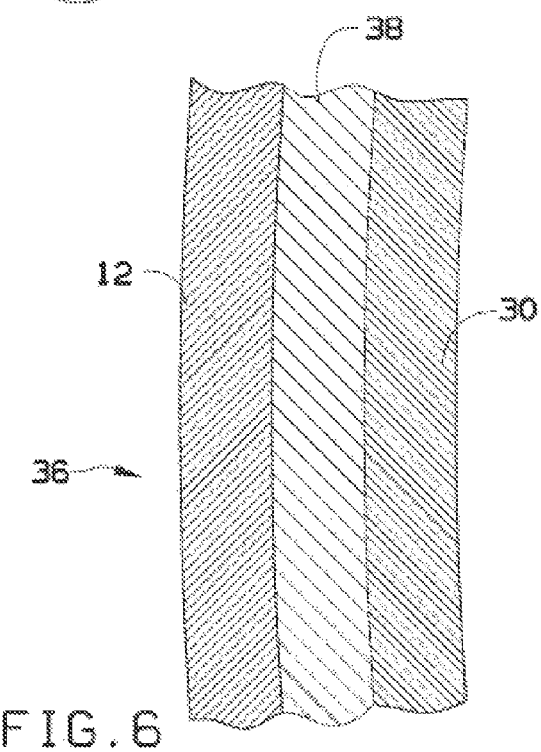
FIG. 6 is a sectional view of a color changing contact lens in accordance with an embodiment of the present invention along line 6-6 in FIG. 5 illustrating layer components of the contact lens.

FIGS. 5 and 6 illustrate a contact lens assembly 36 according to another exemplary embodiment of the invention, which may comprise the inner layer 30, the outer layer 12 and a thermo graphic liquid crystal plastic strip layer 38. In this embodiment, thermo graphic liquid crystal material may be infused into the thermo graphic liquid crystal plastic strip layer 38. The thermo graphic liquid crystal plastic strip layer 38 may be attached to the outer surface of the inner layer 30. The outer layer 12 may be placed over the thermo graphic liquid crystal plastic strip layer 38 to seal and protect the thermo graphic liquid crystal plastic strip layer 38.

FIG. 7 presents an alternative exemplary embodiment of the contact lens assembly 36 wherein a micro tube thermo graphic liquid crystal strip layer 32 may be infused with thermo graphic liquid crystal 34 and placed over the interior surface of the inner layer 30 which may have a plurality of micro tubes 18 machined into its interior surface. The micro tube thermo graphic liquid crystal strip layer 32 may fill the micro tubes 18 and provide a layer of thermo graphic liquid crystal-infused material over the interior surface of the inner layer 30. The micro tube thermo graphic liquid crystal strip layer 32 may then be 25 sealed with an outer layer 12.

In a preferred embodiment, one of the purposes of the contact lens assembly 36 may be that of a functional fashion accessory; an aesthetic device. However, there may be other applications for the contact lens assembly 36, such as criminal investigation applications based upon the ability to detect subtle changes in body temperature, which may indicate changes in heart rate, through the use of the contact lens assembly 36. One of ordinary skill in the art would appreciate that there are numerous applications for embodiments of the present invention, and embodiments of the present invention are contemplated for use with any appropriate application.

Description List

10: is the overall invention.
12: is the contact lens outer layer.
14: is the contact lens brim.
16: is the contact lens iris viewing portal.
18: is the thermographic liquid crystal filled micro tube machined into plastic or glass contact lens material.
20: is the iris.
22: is the eye.
24: is the upper eye lid.
26: is the lower eye lid.

28: is the operator.
30: is the contact lens inner later.
32: is the micro tube thermo graphic liquid crystal strip layer.
34: is the color shifting liquid crystal.
36: is the contact lens.
38: is the thermo graphic liquid crystal plastic strip layer.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A contact lens, said contact lens comprising:
   an inner layer, comprised of an interior surface and an exterior surface, wherein said exterior surface is configured to be placed upon the eye of an individual;
   an outer layer, comprised of an interior surface and an exterior surface, wherein said interior surface of said outer layer is affixed to said interior surface of said inner layer in such a way that creates a sealed area there between; and
   an amount of liquid crystal material, wherein said amount of liquid crystal material is contained within said sealed area.

2. The contact lens of claim 1, wherein said interior surface of said inner layer is further comprised of a plurality of micro tubes.

3. The contact lens of claim 2, wherein said plurality of micro tubes is configured to receive at least a portion of said amount of liquid crystal material.

4. The contact lens of claim 1, wherein said amount of liquid crystal material is configured to respond to one or more stimuli.

5. The contact lens of claim 4, wherein at least one of said one or more stimuli is temperature changes.

6. The contact lens of claim 4, wherein at least one of said one or more stimuli is changes in the amount of visible light.

7. The contact lens of claim 4, wherein said response includes changing of a color of the amount of liquid crystal material.

8. The contact lens of claim 4, wherein said response includes changing of a shape of the amount of liquid crystal material.

9. The contact lens of claim 8, wherein said change in shape creates a visible pattern.

10. The contact lens of claim 1, wherein said amount of liquid crystal material comprises a thermo graphic liquid crystal material.

* * * * *